March 14, 1961 A. C. HOBDELL 2,974,941
MANUFACTURE OF METAL ARTICLES
Filed Aug. 1, 1958 5 Sheets-Sheet 1

INVENTOR
A. C. Hobdell

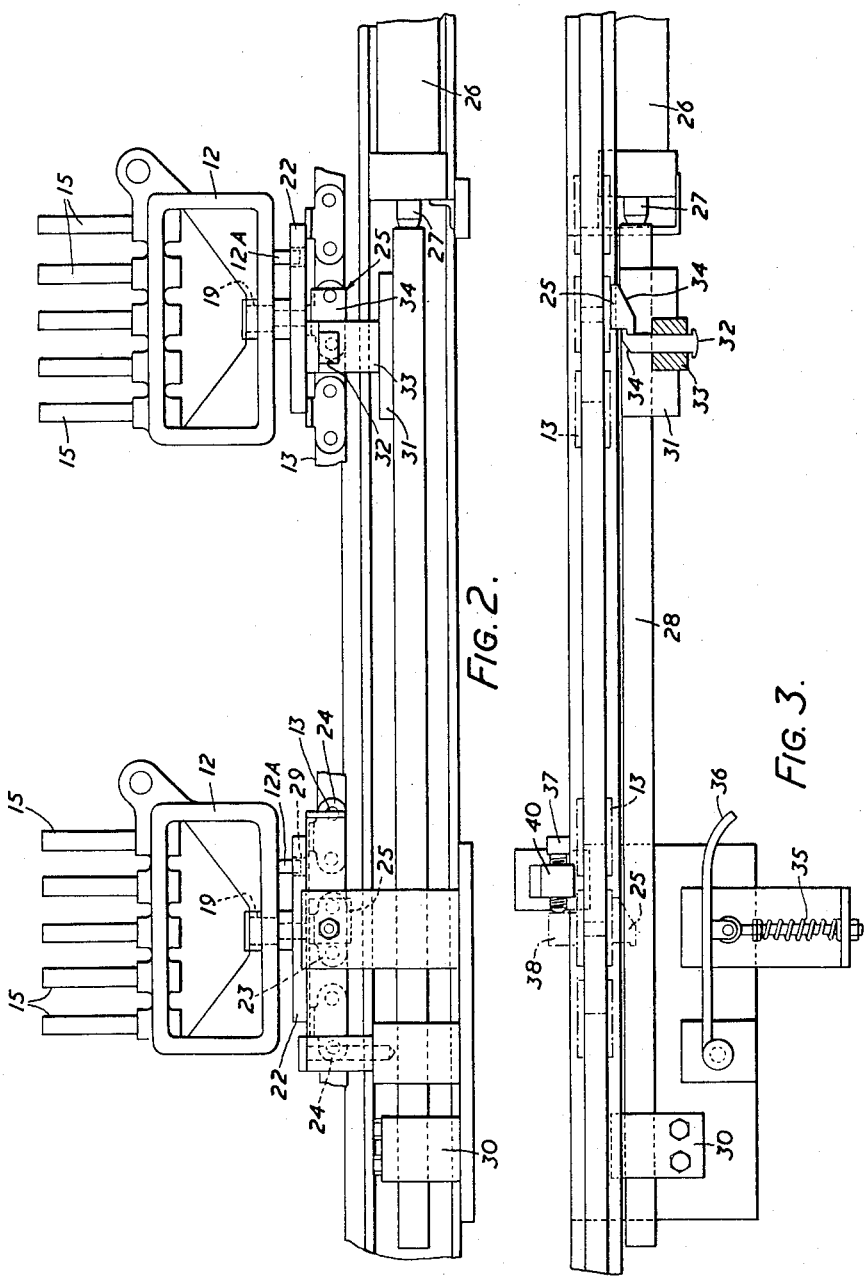

2,974,941

MANUFACTURE OF METAL ARTICLES

Alan Cyril Hobdell, 88 Henley Ave., Norton, Sheffield 8, England

Filed Aug. 1, 1958, Ser. No. 752,648

Claims priority, application Great Britain Aug. 2, 1957

14 Claims. (Cl. 266—4)

This invention relates to the manufacture of metal articles and is particularly concerned with the hardening of articles of cutlery, such as knife blades, and other metal articles.

One object of the present invention is to provide apparatus which will operate automatically to harden metal articles. Another object is to prevent distortion of heated articles during cooling, and, more generally, to ensure that the articles have a prescribed shape in such circumstances.

In accordance with the present invention, the articles to be hardened are heated to a hardening temperature, they are then moved into position between clamping members, brought to rest and clamped by the clamping members in the desired shape; the articles are held stationary between the clamping members until they are sufficiently cooled to retain permanently the desired shape.

The invention also provides apparatus for performing the above method. Thus, automatic hardening apparatus according to the present invention comprises heating means for the articles to be hardened, clamping means and intermittently operating conveying means, the arrangement being such that the articles are heated by the heating means, moved to the clamping means and halted, and the clamping means are clamped on to the articles while stationary, in order to bring to, or hold in, desired shape the articles.

Preferably, the automatic hardening apparatus comprises a conveyor arranged to be driven intermittently with stationary periods alternating with periods of movements, at least one holder designed to carry a plurality of articles to be hardened and arranged to be driven by the conveyor along a predetermined path, heating means for heating the articles carried by the holder during at least one of the stationary periods, a plurality of clamps each for clamping an article in a desired shape during a subsequent stationary period, positioning means arranged to halt the holder with the articles aligned with the clamps, and means for operating the clamps so that the clamps are forced on to the articles while stationary and are released from the articles prior to the next conveyor movement.

Figure 1:
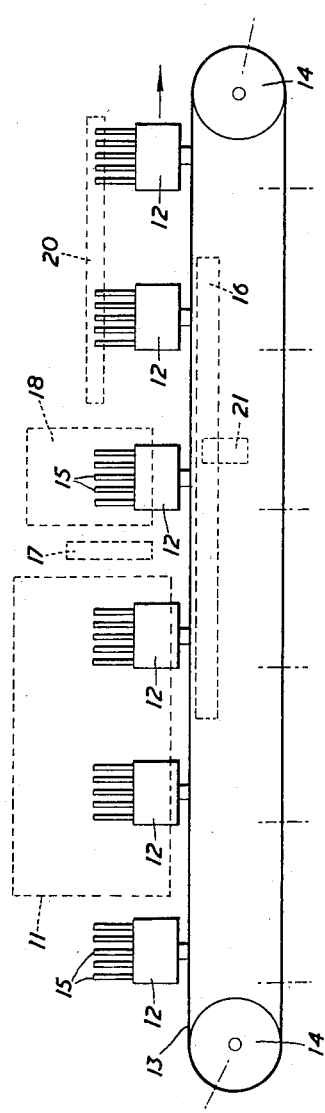
Figure 8:
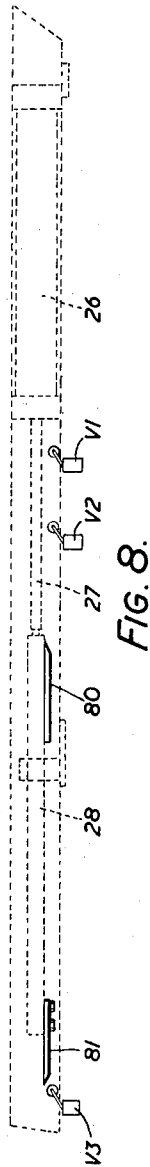
Figures 4, 5:
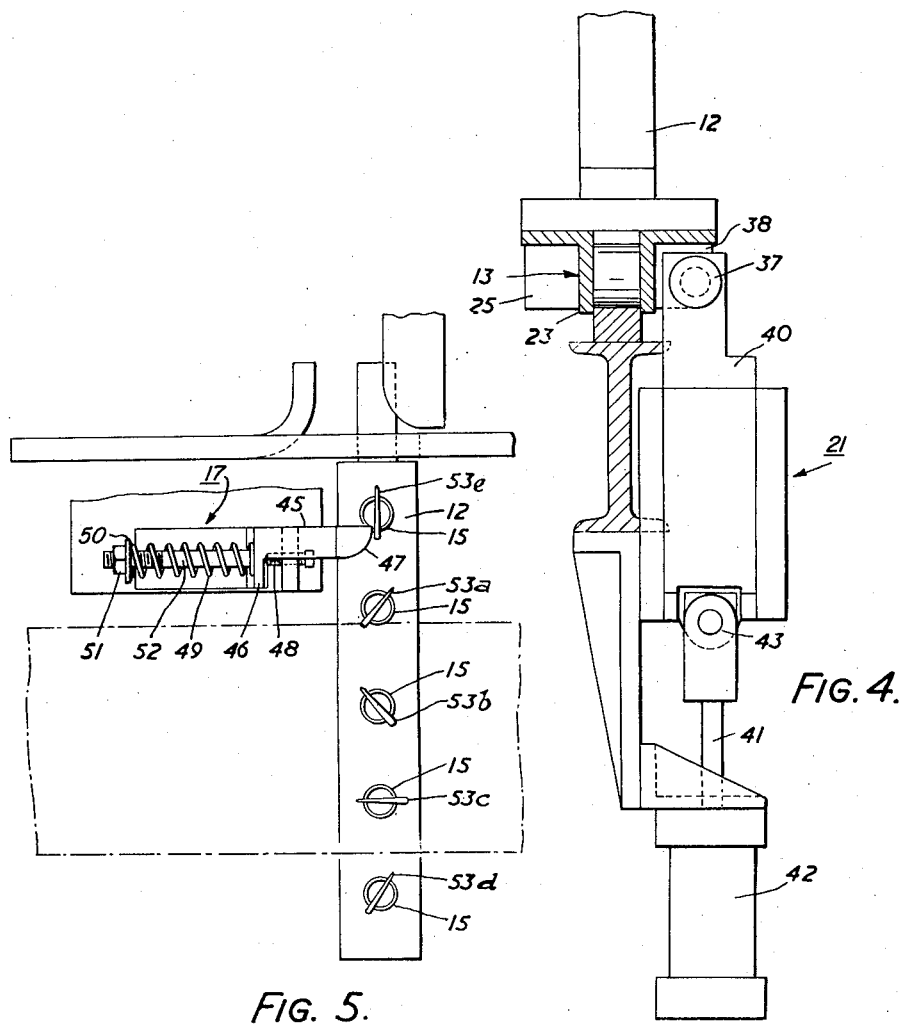
Figure 6:
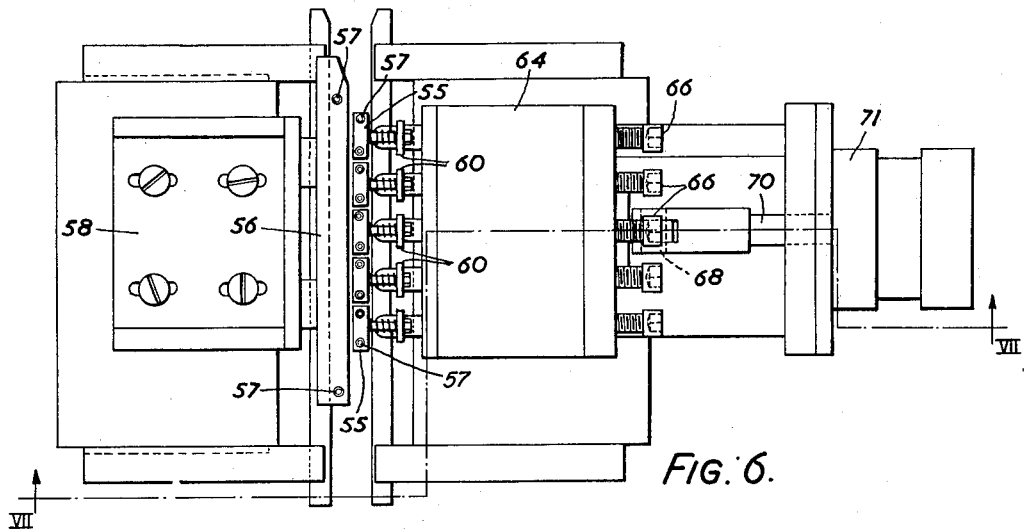
Figure 7:
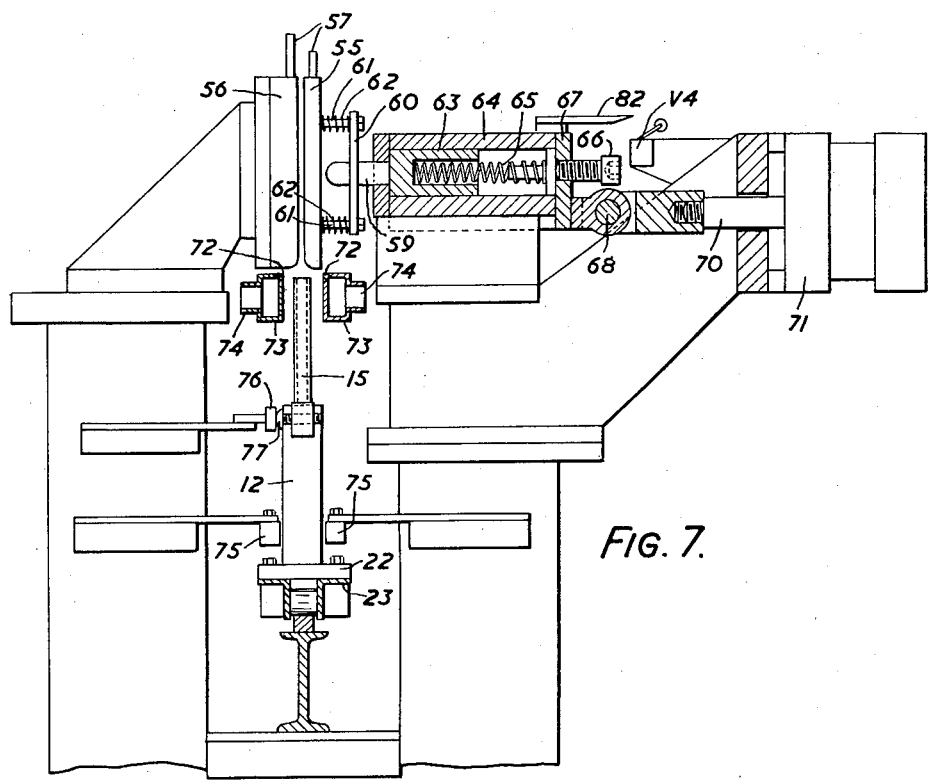
Figure 9:
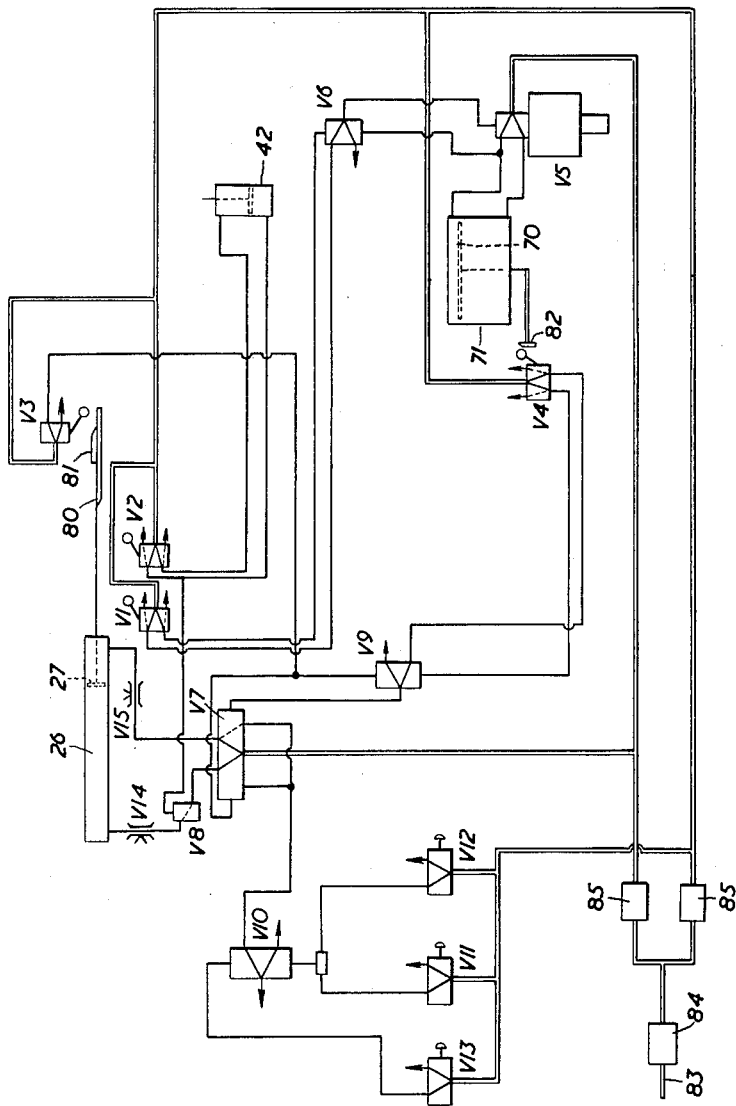

The invention will be more readily understood by way of example from the following description of apparatus for automatically hardening knife blades, reference being made to the accompanying drawings in which:

Figure 1 illustrates schematically the apparatus,

Figures 2 and 3 are a side view and plan view respectively of the conveyor drive mechanism of Figure 1, the knife holders being omitted from Figure 3, Figure 4 is a sectional view transverse to the conveyor illustrating the mechanism positioning the knife blades in relation to the clamping mechanism of Figure 1, Figure 5 is a plan view illustrating an aligning device for aligning the blades in their holders prior to entry to the clamping mechanism, Figure 6 is a plan view and Figure 7 is a sectional view on the line VII—VII of Figure 6 illustrating the clamping mechanism, Figure 8 schematically illustrates the positioning of cams and valves controlling the operation of the pneumatic system, and Figure 9 schematically illustrates the pneumatic system itself.

In the following description, the apparatus and the sequence of operation will be first described generally and will be followed by a description of the various parts of the apparatus.

Referring to Figure 1, a number of knife holders 12 are attached to and carried by an endless chain 13 or other conveyor which passes round the end sprockets 14. Each holder 12 has a number of tubes 15 which extend upwardly and which are aligned in the direction of movement of the conveyor. Each tube 15 is arranged to receive the tang of a knife to be hardened.

The conveyor is driven intermittently by a drive mechanism shown schematically at 16, with stationary periods alternating with periods of movement. The extent of each movement is equal to the separation between holders 12 so that the holders are successively brought into a number of predetermined positions which are illustrated in the drawing.

In the first stationary position shown at the left hand end of Figure 1, the knife blades are loaded into the tubes 15 of the holders. In the next stationary position, the loaded holder is within a furnace indicated schematically at 11. In the third stationary position, the holder is still within the furance 11 but is now adjacent the exit end. While moving from the third stationary position to the fourth stationary position, the holder 12 moves out of the furnace 11 and past an aligning device 17, which aligns the blades parallel to the movement of the conveyor; this device will be described in more detail hereinafter. In the fourth stationary position, the holder 12 is located in a clamping mechanism indicated at 18, where the knife blades are individually clamped between fixed and moving clamping members. In the clamping mechanism, the blades are positively cooled and cooling of the blades is concluded in the fifth and sixth stationary positions where the blades are located adjacent an air-cooling manifold 20 which directs cooling air on to the blades.

The positioning of the holders 12 on each successive movement step is determined by a positive stop 21 which engages with a suitable abutment on the conveyor. This stop 21 is positioned so that the blades carried by the holder entering the clamping mechanism 18 are properly located in relation to the clamping members.

The arrangement shown in Figure 1 is, of course, subject to modification. The length of the stationary period is pre-chosen to ensure that the knives after leaving the clamping mechanism 18 will retain the desired shape thereafter. This length of time having been determined, the number of stationary positions of the holder 12 within the furnace 11 and hence the length of the furnace is determined by the temperature at which the furnace is maintained and the general requirement that the blades should reach a prescribed temperature before leaving the furnace.

The clamping mechanism 18 straightens the knife blades, if they should have become distorted during manufacture or heat treatment, and prevent any distortion that might otherwise occur during cooling. After leaving the manifold 20, the holders 12 pass around the right hand sprocket 14 and are thereby caused to fall out of the tubes 15 into a container or other collecting device.

The drive mechanism for the conveyor is illustrated in Figures 2 and 3. As shown in Figure 2, each holder 12 is pivotally mounted on a plate 22 by a pivot 19. Plate 22 is secured to one link 23 of the chain 13 and is prevented from tilting by contact with the links 24 on each side of link 23. Movement of holder 12 about pivot 19 is restricted by a pin 12A within a larger hole 29 in the plate 22.

The chain carries a number of hooklike coupling members 25, one being secured on each link 23 carrying a holder 12; as a consequence, the coupling members 25 are spaced apart by the same distance as the holder 12. The intermittent movement of the chain is produced by a pneumatic cylinder 26 which causes the piston rod 27 to reciprocate between stationary periods. The protruding end of piston rod 27 is secured to an extension rod 28 of square cross section which is carried in a supporting bearing block 30 and which carries a plate 31 having mounted therein a hooked plunger 32 which is slidably arranged in the bearing block 33. Both the coupling member 25 and the plunger 32 have cam surfaces 34 which permit the plunger 32 to ride over a coupling member 25 during its backwards movement, i.e. from right to left as viewed in Figure 3.

In operation, the piston 27 is caused to effect a reciprocation by the means to be described hereinafter. During the outward movement to the left, the plunger 32 is free of the coupling members 25 and the chain conveyor. Towards the completion of the outward movement, plunger 32 rides over a coupling member 25, and in doing so is caused to move away from the coupling member 25 against the action of a spring 35 which biases a lever 36 engaged by the plunger 32 at this time and which causes the plunger 32 to return after having passed over the coupling member 25. In this way, the plunger 32 is hooked beyond the coupling member 25 and, during the succeeding inward movement of the piston 27 to the right, draws the coupling member 25 and hence the chain conveyor 13 with it. The throw of the piston 27 is chosen to be equal to the separation of the holders 12 and coupling members 25.

The position stop of Figure 1 for the conveyor is shown in detail in Figure 4 and consists of a bolt 37 which can be positioned in the path of the block 38 carried on the same link 23 as the coupling member 25 but on the opposite side. The stop bolt 37 is carried on a plunger 40 which is moved upwards and downwards to bring bolt 37 into and out of the path of block 38 by a piston rod 41 of an air cylinder 42, through a coupling 43.

The knife aligning device 17 of Figure 1 is shown in Figure 5 and consists of an arm 45 which is pivoted at its lower end on pivot pin 46 and which at its upper end has a rounded cam face 47. The lever 45 is biased against the adjustable stop 48 by a spring 49 which engages at its ends against the arm 45 and an abutment 50 on a fixed rod 52 passing through a suitable opening in the arm 45. The stop 48 is adjusted so that normally the tip of the cam face 47 is located just off the line of the centres of the tang-carrying tubes 15. If a knife blade should be displaced from this line, as shown at 53a, 53c or 53d, the part of the blade projecting from the line of centres is engaged by the cam face 47 and the tang is turned within the tube 15 until it takes up the position shown at 53e. If the blade should have the position indicated at 53b, there is a danger that it will jam against the cam face 47; should this occur, the arm 45 moves away from stop 48 against the bias of spring 49 and thus prevents possible damage to the apparatus.

Figures 6 and 7 illustrate the clamping mechanism 18. As there shown, the mechanism comprises a moving clamping block 55 for each of the knife blades carried by the holder 12, and a single common fixed block 56. The fixed block 56 and each of the moving blocks 55 are water cooled, the water being led into and away from the blocks through pipes 57. The fixed clamp block 56 is supported by a bracket 58 which is adjustable laterally. Each of the moving clamping blocks 55 is carried by its own plunger 59, through a plate 60 and two rods 61 which are secured to the block 55 and are slidable in plate 60 against the action of springs 62. The plunger 59 projects beyond plate 60 and its end is rounded. Plunger 59 is part of a piston 63 slidably arranged within a cylinder 64 and forced to the left hand end of the cylinder by a compression spring 65. The tension in spring 65 can be adjusted by bolt 66. The cylinders 64 have a common back plate 67 which is connected through a pivot joint 68 with a piston rod 70 of a clamping air cylinder 71. When the knife blades are in position between the fixed and moving clamping blocks and air is supplied to cylinder 71, the cylinders 64 move forward and each moving clamping block 55 is engaged with its knife blade. The force with which block 55 initially engages the blade is small, by virtue of the sliding connection between rod 61 and plate 60; thus, the block 55 can adjust itself to the taper of the blade before the application of the full clamping pressure by the engagement of the end of plunger 59 with the block 55. This clamping pressure is determined by the compression of spring 65 resulting from the forward movement of piston 70 and this pressure is adjustable by operation of screw 66.

In addition to the water cooling of the blocks 55, 56 the bolsters of the knives are cooled by the application of cooling air directed on to the bolsters by apertures 72 in cooling rails 73 located beneath the clamping blocks and supplied with air through pipes 74.

During entry of the knives between the clamping blocks 55, 56 the holders 12 are guided by the guide rails 75. The rail 76 has a cam face on its surface to receive a button 77 on the holder 12; the cam face is so arranged that the holder 12 is caused to tilt slightly about its transverse axis as it enters the clamping mechanism 18 and thus prevents the blades contacting the fixed clamping block 56 and hence cooling of the blades prior to clamping. The holder 12 is allowed to return to the vertical before the blades are clamped. Lastly, the clamping mechanism generally is protected from heat radiated from the furnace 11 by a water cooled baffle plate (not shown).

The control of the various pneumatic systems mentioned above is illustrated in Figures 8 and 9. The extension rod 28 of the conveyor drive piston 27 carries at its opposite ends two cams 80, 81. Cam 80 operates two pneumatic valves V1, V2, valve V2 being operated by cam 80 towards the end of the return stroke of the piston 27 and valve V1 being operated at the conclusion of that stroke. Cam 81 operates a valve V3 towards the end of the forward movement of piston 27. A third cam 82 carried on the cylinder 64 similarly operates a valve V4 when in its position most distant from the fixed clamping member 56 (see Figure 7).

Turning to Figure 9, compressed air is supplied through an inlet pipe 83, a filter 84 and devices 85 which supply to the compressed air a lubricant as a fog. As shown, the compressed air is supplied to valves V1 to V4 and also to further valves V5, V7 and V11 to V13, to be described hereinafter.

During the inward movement of piston 27, valves V2 and then V1 are operated. When valve V2 is operated, compressed air is passed through that valve to the bottom of the air cylinder 42 (Figure 4) to bring the stop 37 into the path of a block 38. Valve V2 also passes compressed air to a valve V8 which is not operative until pressure is applied to it from valve V2. Operation of valve V8 restricts the flow of exhaust air from cylinder 26 through valve V7 and valve V10 in order to slow down the movement of piston 27 and brings the conveyor up against stop 37 without undue shock.

At the conclusion of the movement of piston 27, valve V1 is operated to pass compressed air through a valve V6 to the valve V5. Valve V5 has a timing mechanism such that it returns to its initial position after a predetermined period, corresponding to the stationary period, after being operated through valve V6. On operation of valve V5 compressed air flows to cylinders 71 (Figures 6 and 7) to operate the clamping mechanism. At the same time, the pressure in cylinder 71 is passed back to valve V6 to cut the latter off. The movement of the clamping piston rod 70 breaks the contact between cam 82 and valve V4 and thus causes the release of the latter. Valve V4 then passes compressed air to a valve V9 and opens it ready for the next signal from valve V4 when the latter valve is again depressed.

At the end of the stationary period, valve V5 reverses and causes the return of piston 70 and the release of the clamping mechanism. Cam 82 depresses valve V4 causing compressed air to flow through valve V9 to reverse the piston of valve V7; compressed air then passes through valve V7 to the left hand end of conveyor cylinder 26, as viewed in Figure 9 and thereby causes the piston 27 to move outwardly. At the start of the outward movement of piston 27, valve V1 is released and compressed air is passed through V1 to valve V6 so that the piston of the latter valve is reversed in readiness for the next signal from valve V1. When subsequently valve V2 is released by cam 80, piston 42 is depressed so that the stop 37 is moved out of the path of block 38 and the pressure is cut off V8 making it non-operative.

At the conclusion of the outward stroke of piston 27, valve V3 is operated and compressed air is passed to valve V7 to reverse it; reversal of valve V7 cuts off compressed air from the left hand side of cylinder 26 and passes it to the right hand side so that the inward movement of piston 27 is immediately initiated. This reversal of valve V7 is made possible because the compressed air supplied to valve V7 from valve V3 also passes to valve V9 and causes the air signal from valve V4 to valve V9 to be cut off. The cycle of operation is then repeated for as long as compressed air is supplied to the system and the valves V11, V12 are not operated.

Valves V11 and V12 are operated by stop buttons located at suitable different positions on the machine. When either is depressed by hand, compressed air is supplied to valve V10 to cause the exhaust flow to be shut off from the cylinder 26. This stops the movement of the piston 27 and the clamping piston 70 is stopped when it reaches the position in which valve V4 is depressed. To restart the operation of the machine, the start valve V13 is operated by its associate push button; compressed air is supplied to valve V10 which reverses and again allows exhaust air to flow from cylinder 26. V14 and V15 are adjustable flow restriction valves which restrict the rate of flow of air therethrough in the direction to the cylinder 26, while permitting unrestricted flow in the opposite direction; they thus enable the speed of movement of the piston 27 in each direction to be adjusted.

While the machine has been described in relation to the hardening of knife blades, it will be understood that other articles of cutlery may be similarly hardened, by appropriate modification of the clamping members 55, 56 and, in fact, the apparatus may be employed with suitable modification for any metal articles requiring hardening by a heating and cooling cycle.

I claim:

1. Apparatus for an automatic hardening treatment of articles, comprising a conveyor to which is secured at least one holder designed to carry a plurality of articles, the articles being received by the holder before treatment and being removed from the holder only after treatment, a plurality of treatment stations, the conveyor conveying the holder along a predetermined path to said treatment stations in succession, means for driving the conveyor intermittently so that each holder in turn is halted at each successive station for a predetermined period, at least one of the treatment stations being provided with heating means arranged to heat the articles carried by the holder when halted at that treatment station, and a subsequent treatment station being provided with cooled clamping means arranged to cool, and to apply clamping pressure individually to, the articles carried by the holder when halted at that treatment station, the clamping means including a fixed common clamping member, and, for each article in the holder, a cooperating movable clamping member, each movable clamping member being so arranged that light clamping pressure is first applied to the relevant article to allow that movable clamping member to tend to conform to the shape of that article, before full clamping pressure is applied to that article.

2. Automatic hardening apparatus according to claim 1 in which the conveyor is an endless chain carrying a plurality of equally spaced holders and a plurality of coupling members engageable by a reciprocatable piston of a fluid-operated ram, the piston engaging a coupling member and moving the conveyor during operation in one direction and being free of the conveyor during operation in the opposite direction to engage the next coupling member on the conveyor.

3. Automatic hardening apparatus according to claim 1 in which there is interposed between the heating means and the clamps along the predetermined path a device which positions each article on the holder for clamping.

4. Automatic hardening apparatus according to claim 1 in which each movable clamping member is slidably mounted on a plunger so that, on movement of the plunger towards the fixed clamping member, the movable clamping member conforms to the shape of the article and the plunger thereafter engages the movable clamping member and applies clamping pressure thereto, and in which the conveyor is an endless chain carrying a plurality of equally spaced holders and a plurality of coupling members engageable by a reciprocatory piston of a fluid operated ram, said piston engaging a coupling member and moving the conveyor during operation in one direction and being free of the conveyor during operation in the opposite direction to engage the next coupling member on the conveyor, said clamping plungers being fluid operated and being controlled by a valve operated when the piston concludes its movement in the said one direction.

5. Automatic hardening apparatus according to claim 1 in which the positioning means is a stop carried on a fluid-operated member, the movement of which is controlled by a valve operated when the piston nears the end of its movement in the said one direction, to bring the stop into the path of the holder towards the end of each movement of the conveyor and to withdraw the stop from the path prior to the initiation of the next movement.

6. Apparatus as claimed in claim 1, which includes positioning means arranged to halt the holder with the articles aligned with the clamping means, the positioning means comprising a stop arranged to be brought into the path of the holder towards the end of each movement of the conveyor and to be withdrawn from the path prior to the initiation of the next movement.

7. Automatic hardening apparatus according to claim 2 in which each coupling member is hook-like and is engageable by a hook-like part of the piston on movement of the piston in the said one direction, the hook-like part being arranged to ride over the coupling members during movement of the piston in the opposite direction.

8. Automatic hardening apparatus according to claim 7 in which reciprocation of the piston is controlled by valves having a timing mechanism for providing the stationary period between successive reciprocations.

9. Automatic hardening apparatus according to claim 8 in which the fluid operated ram is so controlled that the speed of the piston of the ram is reduced as it nears the end of its movement at least in said one direction.

10. Automatic hardening apparatus according to claim 3 in which the articles are supported by, but are pivotal in, the holder and the aligning device is an arm which, if an article is not properly pivotally positioned, engages the article and pivots it to the required position.

11. Automatic hardening apparatus according to claim 10 in which the aligning arm is moveable away from the articles against a bias.

12. Apparatus for automatic hardening treatment of articles, comprising a conveyor to which the articles are attached before treatment and from which the articles are detached only after treatment, a plurality of treatment stations, the conveyor conveying the articles along a predetermined path to said treatment stations in succession, means for driving the conveyor intermittently so that each article in turn is halted at each successive station for a predetermined period, at least one of the treatment stations being provided with heating means arranged to heat each article when halted at that station, and a subsequent treatment station being provided with cooled clamping means arranged to cool and to apply clamping pressure to each article when halted at that station, said clamping means including a fixed clamping member and a cooperating movable clamping member, and a plunger elastically mounting the movable clamping member so that, upon movement of the plunger toward the fixed clamping member, the movable clamping member first applies a light clamping pressure to the article thereby tending to conform to the shape of the article, the plunger thereafter engaging the movable clamping member to apply full clamping pressure to the article.

13. Apparatus as claimed in claim 12, in which each of the clamping members is internally cooled by a liquid-cooling system.

14. Apparatus as claimed in claim 13, which includes auxiliary cooling means comprising a pipe located adjacent to the clamping means directing cooling air to a part of an article located within the clamping means.

References Cited in the file of this patent

UNITED STATES PATENTS

| | | |
|---|---|---|
| 1,251,042 | Jorve | Dec. 25, 1917 |
| 2,022,532 | Beans | Nov. 26, 1935 |
| 2,467,665 | Gogan | Apr. 19, 1949 |
| 2,469,146 | Barnes et al. | May 3, 1949 |
| 2,564,906 | Kincaid et al. | Aug. 21, 1951 |
| 2,831,788 | Bridge et al. | Apr. 22, 1958 |
| 2,914,311 | Yarne | Nov. 24, 1959 |